United States Patent
Morley et al.

(10) Patent No.: US 10,479,858 B2
(45) Date of Patent: Nov. 19, 2019

(54) EPOXY RESIN SYSTEM FOR MAKING CARBON FIBER COMPOSITES

(71) Applicant: Dow Global Technologies LLC, Midland, MI (US)

(72) Inventors: Timothy A. Morley, Schindellegi (CH); Rainer Koeniger, St. Gallenkappel (CH); Martin Reimers, Buehl-Rittersbach (DE); Peter J. Cate, Blockley (GB); Nebojsa Jelic, Wangen (CH); Zeljko Sikman, Lachen (CH)

(73) Assignee: Dow Global Technologies LLC, Midland, MI (US)

( * ) Notice: Subject to any disclaimer, the term of this patent is extended or adjusted under 35 U.S.C. 154(b) by 6 days.

(21) Appl. No.: 15/580,887

(22) PCT Filed: Jun. 22, 2016

(86) PCT No.: PCT/US2016/038619
§ 371 (c)(1),
(2) Date: Dec. 8, 2017

(87) PCT Pub. No.: WO2016/209864
PCT Pub. Date: Dec. 29, 2016

(65) Prior Publication Data
US 2018/0162990 A1  Jun. 14, 2018

Related U.S. Application Data

(60) Provisional application No. 62/184,519, filed on Jun. 25, 2015.

(51) Int. Cl.
| | | |
|---|---|---|
| C08G 59/50 | (2006.01) | |
| C08G 59/56 | (2006.01) | |
| C08G 59/06 | (2006.01) | |
| C08K 5/28 | (2006.01) | |
| C09B 17/04 | (2006.01) | |
| C09B 65/00 | (2006.01) | |
| C09B 67/22 | (2006.01) | |
| C09B 67/44 | (2006.01) | |

(52) U.S. Cl.
CPC ........... *C08G 59/502* (2013.01); *C08G 59/06* (2013.01); *C08G 59/56* (2013.01); *C08K 5/28* (2013.01); *C09B 17/04* (2013.01); *C09B 65/00* (2013.01); *C09B 67/0046* (2013.01); *C09B 67/0083* (2013.01); *C08G 2125/00* (2013.01)

(58) Field of Classification Search
CPC ...... C08G 59/502; C08G 59/56; C08G 59/06; C08G 2125/00; C08K 5/28; C09B 17/04; C09B 65/00; C09B 67/0046; C09B 67/0083
USPC ........................................................ 523/400
See application file for complete search history.

(56) References Cited

U.S. PATENT DOCUMENTS

| | | |
|---|---|---|
| 3,306,872 A | 2/1967 | Maycock |
| 3,341,580 A | 9/1967 | Hechenbleikner |
| 3,379,684 A | 4/1968 | Wiesner |
| 3,477,990 A | 11/1969 | Dante |
| 3,547,881 A | 12/1970 | Mueller |
| 3,637,590 A | 1/1972 | Maycock |
| 3,843,605 A | 10/1974 | Schmidt et al. |
| 3,948,855 A | 4/1976 | Perry |
| 3,956,237 A | 5/1976 | Doorakian et al. |
| 4,048,141 A | 9/1977 | Doorakian et al. |
| 4,093,650 A | 6/1978 | Doorakian et al. |
| 4,131,633 A | 12/1978 | Doorakian et al. |
| 4,132,706 A | 1/1979 | Doorakian et al. |
| 4,171,420 A | 10/1979 | Doorakian et al. |
| 4,177,216 A | 12/1979 | Doorakian et al. |
| 4,302,574 A | 11/1981 | Doorakian et al. |
| 4,320,222 A | 3/1982 | Lopez |
| 4,358,578 A | 11/1982 | Brownscombe |
| 4,366,295 A | 12/1982 | Tyler, Jr. et al. |
| 4,389,520 A | 6/1983 | Gannon |
| 4,992,228 A | 2/1991 | Heck et al. |
| 5,080,851 A | 1/1992 | Flonc et al. |
| 5,112,932 A | 5/1992 | Koenig et al. |
| 5,698,318 A | 12/1997 | Burton et al. |
| 2009/0048370 A1* | 2/2009 | Lutz ........................ C08L 63/00 523/428 |
| 2014/0203324 A1 | 7/2014 | Huang et al. |

FOREIGN PATENT DOCUMENTS

| | | |
|---|---|---|
| DE | 300299 | 6/1992 |
| DE | 300735 | 7/1992 |
| WO | 2008140906 | 11/2008 |
| WO | 2014078218 | 5/2014 |
| WO | 2014078219 | 5/2014 |

* cited by examiner

*Primary Examiner* — David T Karst

(57) ABSTRACT

A two-component curable epoxy resin system including a dye solution. The resin system includes an epoxy resin component containing at least 80% by weight of a polyglycidyl ether of a polyphenol. The system also includes a hardener mixture containing mainly polyethylene tetraamines. The system includes triethylene diamine in specific amounts as a catalyst. The system has beneficial curing characteristics with desired color that make it useful for producing fiber-reinforced composites in a resin transfer molding process.

4 Claims, No Drawings

EPOXY RESIN SYSTEM FOR MAKING CARBON FIBER COMPOSITES

This invention relates to thermosetting resin systems/compositions and processes for preparing fiber-reinforced composites.

BACKGROUND INFORMATION

For many reasons, it is in some cases potentially advantageous to replace metal structural parts with reinforced organic polymers. Among the advantages the reinforced organic polymers offer include better resistance to corrosion, the ability to produce parts having complex geometries, and in some cases a superior strength-to-weight ratio. It is this last attribute that has led, and continues to lead, the adoption of reinforced polymers in the automotive industry as replacement for metal structural elements such as chassis members and other structural supports.

Epoxy resin systems are sometimes used as the polymer phase in such composites. Cured epoxy resins are often quite strong and stiff, and adhere well to the reinforcement. An advantage of epoxy resin systems, compared to most thermoplastic systems, is that low molecular weight, low viscosity precursors are used as starting materials. The low viscosity is an important attribute because it allows the resin system to penetrate easily between and wet out the fibers that usually form the reinforcement. This is necessary to avoid cosmetic blemishes such as flow lines and to produce a high strength composite.

Despite the potential advantages of these polymer composites, they have achieved only a small penetration into the automotive market. The main reason for this is cost. Metal parts can be produced using very inexpensive stamping processes that have the further advantage of producing parts at high operating rates. Polymer composites, on the other hand, must be produced in some sort of mold in which the polymer and reinforcing fibers are held until the polymer cures. The time required for this curing step directly affects production rates and equipment utilization, and therefore costs. Epoxy systems used for making these composites have required long in-mold residence times, and so the production cost has for the most part not been competitive with metal parts. Because of this, the use of epoxy resin composites to replace stamped metal parts has been largely limited to low production run vehicles. It is believed that in-mold curing times need to be reduced into the range of approximately 1 to 3 minutes for epoxy composites to become competitive with stamped metal parts for high production volume vehicles.

There are many known processes to make the fiber-reinforced composites. One of such processes is a so called resin-transfer process. One example is resin transfer molding. In this process, the reinforcing fibers are formed into a preform which is placed into a mold. A mixture of an epoxy resin component and a hardener is then injected into the mold, where it flows around and between the fibers, fills the cavity and cures to form the composite. It is advantageous that an internal mold release agent is included in the resin system. With such internal mold release agent, the resin system become less sticky and the composite can be released from the molds more easily.

The mold-filling step of these processes often takes 15 to 60 seconds or even more, depending on the size of the part and the particular equipment being used. During the entire mold-filling process, the resin system must maintain a viscosity low enough to allow it to flow between the reinforcing fibers and completely fill the mold. Resin systems formulated to cure rapidly also tend to build viscosity quite rapidly. If the fibers are pre-heated, which is often the case, the resin system can react very rapidly at points of contact with the heated fibers. The viscosity increase that accompanies this premature curing makes it difficult for the epoxy resin system to penetrate between fibers and wet them out. This results in moldings having problems that range from cosmetic (visible flow lines, for example) to structural (the presence of voids and/or poor adhesion of the cured resin to the reinforcing fibers, each of which leads to a loss in physical properties).

The problem of too-rapid viscosity build usually cannot be overcome by increasing operating pressures (i.e., the force used to introduce the resin system into the mold) because doing so can move the reinforcing fibers around within the mold, leading to spots that have little or no reinforcement and other regions in which the fibers are packed more densely. This causes inconsistent properties throughout the part, and a general weakening of the composite as a whole. Therefore, an epoxy resin system useful in resin transfer molding (and related) processes should not only have a low initial viscosity and cure rapidly, but should also build viscosity slowly during the initial stages of cure.

Another important consideration is the glass transition temperature of the cured resin. For curing epoxy resin systems, the glass transition temperature increases as the polymerization reactions proceed. It is generally desirable for the resin to develop a glass transition temperature in excess of the mold temperature so the part can be demolded without damage. In some cases, the polymer must in addition achieve a glass transition temperature high enough for the part to perform properly in its intended use. Therefore, in addition to the curing attributes already described, the epoxy system must be one which can attain the necessary glass transition temperature upon full cure.

A glass transition temperature greater than 100° C. is generally regarded as a minimum requirement for many structural composites; a preferred glass transition temperature is 110° C. and a more preferred glass transition temperature is 120° C. or more. This glass transition temperature ideally develops while the part is on the mold, rather than in some post-curing process, so that the composite is strong and rigid upon demolding and so can be demolded without being damaged, and additional costs of performing a post-curing step can be avoided.

The glass transition temperature of known resin systems can be increased through the addition of a cycloaliphatic diamine crosslinker such as isophorone diamine. However the cycloaliphatic diamine reacts more slowly, and as a result it is necessary to increase mold temperatures very significantly in order to obtain short demold times. Even at a 120° C. mold temperature, demold times can be 50 to 100% longer when the cycloaliphatic diamine crosslinker is present. If higher mold temperatures are used, the open time becomes too short. Therefore, this system provides enhanced glass transition temperature at the expense of a much longer demold time and/or a much shorter open time, depending on the mold temperature that is selected. In any event, much higher mold temperatures are needed than is the case when the cycloaliphatic diamine is omitted.

Another very significant issue with the foregoing is the presence of diethylene triamine, which is coming under regulatory pressure in some jurisdictions. There is a strong desire to replace diethylene triamine with an alternative hardener, while retaining the benefits of low initial viscosity, good open time and fast cure. A higher glass transition temperature would be a further advantage, if it could be obtained without comprising the needed curing characteristics.

WO2014078218, incorporated herein by reference in its entirety, provides a novel method for producing good quality fiber-reinforced epoxy resin composites with short cycle times. The epoxy resin system has a long open time and a low initial viscosity, and cures rapidly to produce a composite in which the resin phase has a glass transition temperature of at least 110° C. and preferably at least 120° C. Applicants in WO2014078218, incorporated herein by reference in its entirety, found that the combination of epoxy resin, a polyethylene tetraamine mixture hardener and triethylene diamine provides a unique and unexpected combination of extended open time and fast cure, while at the same time producing a high (>110° C.) glass transition temperature cured polymer. Mold temperatures needed to accomplish this generally do not exceed 130° C.

However, it was also learned that in order to advance to use of carbon fiber composites in vehicles, it is important that these composites should be visually appealing in areas of transportation that might be more visible. As such, the coloring (black or shade thereof) of resin systems used in the manufacture of carbon fiber composites can be useful in order to improve the aesthetics of the final composites. It is desired to use these color improvement approaches to cover effects caused by yellowing of the aromatic based epoxy resin systems, cover up blemishes caused during production, and color the white polyester threads used to stitch fabric performs together in order to make them less visible. Finding a dye that is stable in the resin systems due to their often reactive nature and in the higher temperature conditions used during manufacture of the composite can be a challenge. The dye should be non toxic but also highly soluble and stable in the resin systems. Furthermore, the dye must not impact the reactivity or performance either during the process or of the final part produced and the resin system should still be able to manufacture composites in fast cycle times of several minutes or less.

SUMMARY OF THE INVENTION

The present invention provides a unique combination of some dyes and the resin system. Specifically, the present invention provides a dye system which is stable in the internal mold release component of the epoxy resin system for over 14 days at 60° C. and is able to produce desired colored clear cast, e.g., black, and carbon fiber components via various known composite making processes such as resin transfer molding (RTM) and liquid compression molding (wet compression) processes.

Therefore, in one aspect, the present invention relates to a curable epoxy resin system, comprising 1) an epoxy resin component containing one or more epoxy resins, wherein at least 80% by weight of the epoxy resins is one or more polyglycidyl ethers of a polyphenol that has an epoxy equivalent weight of up to about 250; 2) an amine hardener, wherein the amine hardener is a polyethylene tetraamine mixture containing at least 95% by weight polyethylene tetraamines, the mixture containing at least 40% by weight linear triethylene tetraamine, wherein at least 0.8 epoxy equivalents are provided to the reaction mixture by the epoxy resin component per amine hydrogen equivalent provided by the amine hardener; and 3) 0.01 to 0.5 moles of triethylene diamine per mole of primary and/or secondary amine compounds in the amine hardener, the triethylene diamine being present in the epoxy resin component, the amine hardener, or both; wherein the resin system further comprises an internal mold release agent mixed with a dye solution.

In a typical embodiment of the present invention, the dye has a napthalene diazine functionality with low degree of sulfonation. An example of such a dye comprises 2-naphthalenol, 1-[2-(2-hydroxy-5-nitrophenyl)diazenyl], acetamide, N-[7-hydroxy-8-[2-(2-hydroxy-4-nitrophenyl) diazenyl]-1-naphthalenyl], and 1-Naphthalenesulfonic acid, 3-hydroxy-4-[2-(2-hydroxy-1-naphthalenyl)diazenyl], sodium salt (1:1) also known as Mordant Black 17.

DETAILED DESCRIPTION OF THE INVENTION

A. Epoxy Resin Component

In the present invention, the epoxy resin component contains one or more epoxy resins, by which it is meant compounds having an average of two or more epoxide groups that are curable by reaction with a primary or secondary amine per molecule. At least 80% by weight of the epoxy resin component is one or more polyglycidyl ethers of a polyphenol that has an epoxy equivalent weight of up to about 250. Other epoxy resins as described below may constitute up to 20%, preferably from zero to 10% and more preferably from zero to 5% by weight of the epoxy resin component. The polyglycidyl ether of a polyphenol is preferably the only epoxy resin in the epoxy resin component. The polyglycidyl ether of a polyphenol preferably has an epoxy equivalent weight of 160 to 220.

The polyglycidyl ether of the polyphenol may be a diglycidyl ether of a diphenol such as, for example, resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol, or mixtures of two or more thereof. The polyglycidyl ether of the polyphenol may be advanced, provided that the epoxy equivalent weight is about 250 or less.

Among the other epoxy resins that may be present in the epoxy resin composition are, for example, polyglycidyl ethers of polyglycols; epoxy novolac resins including cresol-formaldehyde novolac epoxy resins, phenol-formaldehyde novolac epoxy resins and bisphenol A novolac epoxy resins; cycloaliphatic epoxides; tris(glycidyloxyphenyl)methane; tetrakis(glycidyloxyphenyl)ethane; tetraglycidyl diaminodiphenylmethane; oxazolidone-containing compounds as described in U.S. Pat. No. 5,112,932, incorporated herein by reference in its entirety; and advanced epoxy-isocyanate copolymers such as those sold commercially as D.E.R.™ 592 and D.E.R.™ 6508 (The Dow Chemical Company).

Still other useful epoxy resins are described, for example, in WO 2008/140906, incorporated herein by reference in its entirety.

The epoxy resin component preferably has a low monohydrolyzed resin content. The epoxy resin may contain, for example, no more than 3%, preferably no more than 2% and still more preferably no more than 1% by weight of monohydrolyzed resin species. Monohydrolyzed resin species are α-glycol compounds formed by the addition of a molecule of water to an epoxide group. The presence of significant quantities of monohydrolyzed species tends to increase the viscosity of the epoxy resin component, and in turn that of the epoxy resin/hardener mixture. In addition, it is believed that these species may contribute to a reduction in open time.

The epoxy resin component may contain optional ingredients. Among these are solvents or reactive diluents such as are described in WO 2008/140906, incorporated herein by reference in its entirety, pigments, antioxidants, preservatives, impact modifiers, short (up to about 6 inches (15.24 cm) in length, preferably up to 2 inches (5.08 cm) in length, more preferably up to about ½ inch (1.27 cm) in length) reinforcing fibers, non-fibrous particulate fillers including micron- and nano-particles, wetting agents and the like. An electro-conductive filler may also be present in the epoxy resin component.

In a preferred embodiment of the present invention, a digycidyl ether of bis phenol A was used. It is commercially available as Voraforce™ 5310 from The Dow Chemical Company. It has an epoxy equivalent weight of about 178 g/eq.

B. Hardener Component (Amine Hardener)

The hardener is preferably a polyethylene tetraamine mixture. By "polyethylene tetraamime mixture", it is meant a mixture of polyethylene polyamine compounds, of which at least 95% by weight have exactly four amine nitrogen atoms. For purposes of this invention, those polyethylene polyamine compounds having exactly four amine nitrogen atoms are referred to as "polyethylene tetraamine" compounds.

The polyethylene tetraamine compound can be linear, branched and/or or cyclic. At least 40% of the weight of the polyethylene tetraamine mixture is linear triethylene tetraamine, i.e.:

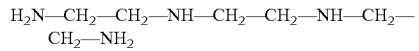

Linear triethylene tetraamine may constitute at least 60%, at least 90%, at least 95%, up to 100%, of the weight of the polyethylene tetraamine mixture.

The polyethylene tetraamine mixture may include other polyethylene tetraamine compounds such as, for example, N,N'-bis(2aminoethyl)piperazine, (piperazinoethyl)ethylenediamine and tris(aminoethyl)amine. These polyethylene tetaramine compounds are commonly present in significant amounts (up to, for example 55% or up to 35% by weight in the aggregate) in commercially available TETA (triethylene tetraamine) products.

The polyethylene tetraamine mixture may include small amounts of other aliphatic or cycloaliphatic amine compounds having three or fewer amine nitrogen atoms or five or more amine nitrogen atoms. These compounds preferably constitute at most 5% by weight, preferably at most 2% by weight and more preferably at most 1% by weight of the polyethylene tetraamine mixture.

The polyethylene tetraamine mixture preferably is the only hardener in the curable epoxy resin system. If other hardeners are present, they preferably constitute no more than 20%, more preferably no more than 10% and still more preferably no more than 5% by weight of the hardeners. Among the other hardeners that can be used are, for example, dicyandiamide, phenylene diamine (particularly the meta-isomer), bis(4-amino-3,5-dimethylphenyl)-1,4-diisopropylbenzene, bis(4-amino-phenyl)1,4-diiospropylbenzene, diethyl toluene diamine, methylene dianiline, mixtures of methylene dianiline and polymethylene polyaniline compounds (sometimes referred to as PMDA, including commercially available products such as DL-50 from Air Products and Chemicals), diaminodiphenylsulfone, phenolic hardeners including those represented by the structure (I)

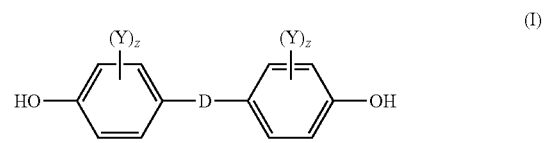

where each Y independently represents a halogen atom, each z is independently a number from 0 to 4 and D is a divalent hydrocarbon group as described with regard to structure I above. Examples of suitable phenolic hardeners include dihydric phenols such as bisphenol A, bisphenol K, bisphenol F, bisphenol S and bisphenol AD, and mixtures thereof, and their mono-, di-, tri- and tetra-brominated counterparts and amino-functional polyamides. These are available commercially under as Versamide® 100, 115, 125 and 140, from Henkel, and Ancamide® 100, 220, 260A and 350A, from Air Products and Chemicals.

In one preferred embodiment, the hardener component of the present invention contains over 90 wt. % of triethylenetetramine and the rest being 1,4-diazabicyclo[2,2,2]octane, based on the total weight of the hardener component.

C. Preparation of the Resin System

The hardener and epoxy resin components are combined in amounts such that at least 0.8 epoxy equivalents are provided to the reaction mixture per amine hydrogen equivalent provided by the epoxy resin component. A preferred amount is at least 0.90 epoxy equivalents per amine hydrogen equivalent and a still more preferred amount is at least 1.0 epoxy equivalents per amine hydrogen equivalent. The epoxy resin can be provided in large excess, such as up to 10 epoxy equivalents per amine hydrogen equivalent provided to the reaction mixture, but preferably there are no more than 2, more preferably no more than 1.20 and still more preferably no more than 1.10 epoxy equivalents provided per amine hydrogen equivalent. Embodiments in which the amine hardener is present in a small excess (such as, for example from 0.0 to 0.95 epoxy equivalents per equivalent of amine hydrogens) often exhibit particularly short demold times while producing a cured resin having a high glass transition temperature.

Triethylene diamine (TEDA) is provided to the reaction mixture and is present in the epoxy resin component, amine hardener, or both, and performs a catalytic role. A suitable amount is about 0.01 to 0.5 moles of triethylene diamine per part per mole of per mole of primary and/or secondary amine compounds in the amine hardener. A preferred lower amount is 0.025 moles and a more preferred lower amount is 0.075 moles of triethylene diamine per mole of per mole of primary and/or secondary amine compounds in the amine hardener. A preferred upper amount is up to 0.25 moles and a more preferred upper amount is up to 0.20 moles of triethylene diamine, in each case per mole of primary and/or secondary amine compounds in the amine hardener. An especially preferred amount is 0.09 to 0.175 moles of triethylene diamine per mole of primary and/or secondary amine compounds in the amine hardener.

Any of the foregoing catalysts can be used in conjunction with one or more other catalysts. If such an added catalyst is used, suitable such catalysts include those described in, for example, U.S. Pat. Nos. 3,306,872, 3,341,580, 3,379,684, 3,477,990, 3,547,881, 3,637,590, 3,843,605, 3,948,855, 3,956,237, 4,048,141, 4,093,650, 4,131,633, 4,132,706, 4,171,420, 4,177,216, 4,302,574, 4,320,222, 4,358,578, 4,366,295, and 4,389,520, and WO 2008/140906, all incorporated herein by reference in their entireties. Examples of suitable catalysts are imidazoles such as 2-methylimidazole; 2-ethyl-4-methylimidazole; 2-phenyl imidazole; tertiary amines such as triethylamine, tripropylamine, N,N-dimethyl-1-phenylmethaneamine and 2,4,6-tris((di-methylamino)methyl)phenol and tributylamine; phosphonium salts such as ethyltriphenylphosphonium chloride, ethyltriphenylphosphonium bromide and ethyltriphenylphosphonium acetate; ammonium salts such as benzyltrimethylammonium chloride and benzyltrimethylammonium hydroxide; various carboxylic acid compounds, and mixtures any two or more thereof.

In some specific embodiments, the triethylene diamine is the sole catalyst provided to the reaction mixture, it being understood that components of the amine hardener are not for purposes of this invention considered as catalysts.

In some embodiments, the reaction mixture contains water and/or a compound having at least one hydroxyl group and an equivalent weight per hydroxyl group of up to 75, preferably up to 50. This compound, if present, is suitably present in small amounts, such as from 0.1 to 10 parts by weight, preferably from 0.25 to 5 parts and still more preferably from 1 to 3 parts by weight per part by weight of triethylene diamine. Besides water, suitable such compounds include, for example, alkanols such as methanol, ethanol, 1-propanol, 2-propanol, 1-butanol, 2-butanol, 1-pentanol, neopentanol, 1-hexanol and the like; alkylene glycols such as ethylene glycol, 1,2-propane diol, 1,3-propane diol, 1,4-butane diol, and neopentyl glycol; poly(alkylene glycols) such as diethylene glycol, triethylene glycol, dipropylene glycol, tripropylene glycol and the like; glycol monoethers such as ethylene glycol monomethyl ether, diethylene glycol monomethyl ether, 1,2-propane diol monomethyl ether, dipropylene glycol monomethyl ether, as well as the corresponding ethyl ethers; glycol monoesters such as ethylene glycol monoacetate, diethylene glycol monoacetate, 1,2-propane diol monoacetate, dipropylene glycol monoacetate; higher functionality polyols such as glycerin, oligomers of glycerin, trimethylolpropane, trimethylolethane, pentaerythritol, erythritol, sorbitol, sucrose and the like; and mono- di- or trialkanolamines such as monoethanolamine, diethanolamine, triethanolamine, monoisopropanolamine, diisopropanolamine, triisopropanolamine, aminoethyl-ethanolamine and the like.

The curable reaction mixture may contain other optional components such as impact modifiers, internal mold release agents, pigments, antioxidants, preservatives, impact modifiers as described before, short (up to about 6 inches (15.24 cm) in length, preferably up to 2 inches (5.08 cm) in length, more preferably up to about ½ inch (1.27 cm) in length) reinforcing fibers, non-fibrous particulate fillers including micron- and nanoparticles, wetting agents, internal mold release agents and the like. An electroconductive filler may be present in the hardener mixture.

Suitable impact modifiers include natural or synthetic polymers having a $T_g$ of lower than −40° C. These include natural rubber, styrene-butadiene rubbers, polybutadiene rubbers, isoprene rubbers, polyethers such as poly(propylene oxide), poly(tetrahydrofuran) and butylene oxide-ethylene oxide block copolymers, core-shell rubbers, mixtures of any two or more of the foregoing, and the like. The rubbers are preferably present in the form of small particles that become dispersed in the polymer phase of the composite. The rubber particles can be dispersed within the epoxy resin or hardener and preheated together with the epoxy resin or hardener prior to forming the hot reaction mixture.

It is generally preferred to cure the epoxy resin and the hardener in the presence of an internal mold release agent (IMR). Such an internal mold release agent may constitute up to 5%, more preferably up to about 1% of the total weight of the reaction mixture. Suitable internal mold release agents are well known and commercially available, including those marketed as Marbalease™ by Rexco-USA, Mold-Wiz™ by Axel Plastics Research Laboratories, Inc., Chemlease™ by Chem-Trend, PAT™ by Wiirtz GmbH, Waterworks Aerospace Release by Zyvax and Kantstik™ by Specialty Products Co. In addition to (or instead of) adding the internal mold release agent at the mixhead, it is also possible to combine such an internal mold release agent into the resin component and/or the hardener before the resin component and the hardener are brought together.

In a preferred embodiment, a pigment/dye system is present via a dye solution mixed first with the internal mold release agent which is comprised of about 2 wt % of the final resin composition. For example, the dye solution is prepared by mixing Acid Black 107 available from the Pylam Products Company, Inc. with the internal mold release agent PAT 657/BW. Acid Black 107 comprises the following components: 2-naphthalenol, 1-[2-(2-hydroxy-5-nitrophenyl) diazenyl] (CAS No. 14847-54-2), acetamide, N-[7-hydroxy-8-[2-(2-hydroxy-4-nitrophenyl) diazenyl]-1-naphthalenyl] (CAS No. 4325-96-6) and Mordant Black 17 (CAS No. 2538-85-4).

This mixture of PAT 657/BW with Acid Black 107 is then further mixed with the epoxy hardener comprising of TETA and 1,4-Diazabicyclo[2.2.2]octane and an epoxy resin such as VORAFORCE™ 5310 to form the final epoxy system. This resulting combined epoxy resin system, when liquid, can be added to a carbon fiber perform to form a colored composite article in a short cycle time when produced via the RTM or wet compression process.

Alternatively, the same dye system is also stable in the hardener component of the epoxy resin system for over 4 days at 60° C. and is also able to produce "black" colored, or shades thereof, clear cast and carbon fiber components via the RTM and liquid compression molding (wet compression) manufacturing processes. Here, the dye solution is prepared by mixing Acid Black 107 with the hardener component comprising of TETA and 1,4-Diazabicyclo [2.2.2]octane and then further mixing with an epoxy resin such as VORAFORCE™ 5310 and an internal mold release agent to form the final epoxy system. This resulting combined epoxy system, when liquid, can similarly be added to a carbon fiber perform to form a colored composite article in a short cycle time when produced via the RTM or wet compression process.

The same dye system may also be first added to the epoxy resin component with similar results.

While the above description focused on imparting a black color to the resin system and the resulting composites, other desired colors may be obtained using the same method with a different dye system. Many different dyes may be considered as applicable for the present invention. It is suspected that for good solubility and stability in the hardener in general, napthalene diazine functionality with low degree of sulfonation is important when selecting appropriate dyes for the desired color results.

The amount of dye such as Acid Black 107 used in the present invention depends on desired appearance of the final carbon fiber composite. For example, in a preferred embodiment where the dye solution is first mixed with the IMR agent, the weight ratio of Acid Black 107 to IMR agent is typically from 0.005 to 0.1 parts by weight of the formulation, preferably 0.01 to 0.06 parts by weight and more preferably 0.015 to 0.05 parts by weight.

In some embodiments, the curable epoxy resin system has, when cured at at least one temperature between 100 and 120° C., a gel time of at least 60 seconds and a time to vitrification of no greater than 350 seconds, preferably no greater than 300 seconds and still more preferably no greater than 240 seconds. Gel time and time to vitrification are for purposes of this invention measured by chemorheological methods using an Anton PaarMCR 301 rheometer or equivalent device, in which the instrument is preheated to the cure temperature prior to each measurement. The intersection of the G' and G" plots represents the gel time, and the peak of the G" curve represents the time to vitrification.

Thermosets are formed from the epoxy resin system of the invention by mixing the epoxy resin component and hardener at proportions as described before and curing the resulting mixture. Either or both of the components can be preheated if desired before they are mixed with each other. It is generally necessary to heat the mixture to an elevated temperature to obtain a rapid cure. In a molding process such as the process for making molded composites described below, the curable reaction mixture is introduced into a mold, which may be, together with any reinforcing fibers and/or inserts as may be contained in the mold, preheated. The curing temperature may be, for example, from 60 to 180° C. When a long (at least 30 seconds, preferably at least 40 seconds) gel time is desirable, the curing temperature preferably is not greater than 130° C. When both a long gel time and a short demold time is wanted, a suitable curing temperature is 80 to 120° C., preferably 95 to 120° C. and especially 105 to 120° C.

It is preferred to continue the cure until the resulting polymer attains a glass transition temperature in excess of the cure temperature. The glass transition temperature at the time of demolding is preferably at least 100° C., more preferably at least 110° C., still more preferably at least 115° C. and even more preferably at least 120° C. An advantage of this invention is that such glass transition temperatures can be obtained with short curing times. This allows for short cycle times. Demold times at cure temperatures of 95 to 120° C., especially 105 to 120° C., are typically 350 seconds or less, preferably are 300 seconds or less and more preferably 240 seconds or less.

D. Carbon Fiber Composites

The curable epoxy resin system of the invention is particularly useful for making fiber-reinforced composites by curing the resin system in the presence of reinforcing fibers. These composites are in general made by mixing the epoxy resin component with the hardener to form a mixture, wetting the fibers with the mixture, and then curing the mixture in the presence of the catalyst and the reinforcing fibers.

The reinforcing fibers are thermally stable and have a high melting temperature, such that the reinforcing fibers do not degrade or melt during the curing process. Suitable fiber materials include, for example, glass, quartz, polyamide resins, boron, carbon, wheat straw, hemp, sisal, cotton, bamboo and gel-spun polyethylene fibers.

The reinforcing fibers can be provided in the form of short (0.5 to 15 cm) fibers, long (greater than 15 cm) fibers or continuous rovings. The fibers can be provided in the form of a mat or other preform if desired; such mats or performs may in some embodiments be formed by entangling, weaving and/or stitching the fibers, or by binding the fibers together using an adhesive binder. Preforms may approximate the size and shape of the finished composite article (or portion thereof that requires reinforcement). Mats of continuous or shorter fibers can be stacked and pressed together, typically with the aid of a tackifier, to form preforms of various thicknesses, if required.

Suitable tackifiers for preparing performs (from either continuous or shorter fibers) include heat-softenable polymers such as described, for example, in U.S. Pat. Nos. 4,992,228, 5,080,851 and 5,698,318, incorporated herein by reference in their entireties. The tackifier should be compatible with and/or react with the polymer phase of the composite, so that there is good adhesion between the polymer and reinforcing fibers. A heat-softenable epoxy resin or mixture thereof with a hardener, as described in U.S. Pat. No. 5,698,318, is especially suitable. The tackifier may contain other components, such as one or more catalysts, a thermoplastic polymer, a rubber, or other modifiers.

A sizing or other useful coating may be applied onto the surface of the fibers before they are introduced into the mold. A sizing often promotes adhesion between the cured epoxy resin and the fiber surfaces.

The composite may be formed in a mold. In such a case, the reinforcing fibers may be introduced into the mold before the epoxy resin/hardener mixture. This is normally the case when a fiber preform is used. The fiber preform is placed into the mold and the epoxy resin/hardener mixture is then injected into the mold, where it penetrates between the fibers in the preform, fills the cavity, and then cures to form a composite product.

Alternatively, the fibers (including a preform) can be deposited into an open mold, and the reaction mixture can be sprayed or injected onto the preform and into the mold. After the mold is filled in this manner, the mold is closed and the reaction mixture cured.

Short fibers can be injected into the mold with the hot reaction mixture. Such short fibers may be, for example, blended with the epoxy resin or hardener (or both) prior to forming the reaction mixture. Alternatively, the short fibers may be added into the reaction mixture at the same time as the epoxy and hardener are mixed, or afterward but prior to introducing the hot reaction mixture into the mold.

Alternatively, short fibers can be sprayed into a mold. In such cases, the reaction mixture can also be sprayed into the mold, at the same time or after the short fibers are sprayed in. When the fibers and reaction mixture are sprayed simultaneously, they can be mixed together prior to spraying. Alternatively, the fibers and reaction mixture can be sprayed into the mold separately but simultaneously. The sprayed materials may be spread and/or leveled using a doctor blade or similar device before closing the mold and performing the cure. In a process of particular interest, long fibers are chopped into short lengths and the chopped fibers are sprayed into the mold, at the same time as or immediately before the hot reaction mixture is sprayed in. Mesh materials often function as flow promoters.

Composites made in accordance with the invention may have fiber contents of at least 10 volume percent, preferably at least 25 volume percent or at least 35 volume percent, up to 80 volume percent, preferably up to 70 volume percent, more preferably up to 60 volume percent.

The mold may contain, in addition to the reinforcing fibers, one or more inserts. Such inserts may function as reinforcements, may function as flow promoters, and in some cases may be present for weight reduction purposes. Examples of such inserts include, for example, wood, plywood, metals, various polymeric materials, which may be foamed or unfoamed, such as polyethylene, polypropylene, another polyolefin, a polyurethane, polystyrene, a polyamide, a polyimide, a polyester, polyvinylchloride and the like, various types of composite materials, and the like, that do not become distorted or degraded at the temperatures encountered during the molding step.

The reinforcing fibers and core material, if any, may be enclosed in a bag or film such as is commonly used in vacuum assisted processes.

The mold and the preform (and any other inserts, if any) may be heated to the curing temperature or some other useful elevated temperature prior to contacting them with the reaction mixture. The mold surface may be treated with an external mold release agent, which may be solvent or water-based.

The process of the invention is useful to make a wide variety of composite products, including various types of automotive parts. Examples of these automotive parts include vertical and horizontal body panels, automobile and truck chassis components, and so-called "body-in-white" structural components.

Body panel applications include fenders, door skins, hoods, roof skins, decklids, tailgates and the like. Body panels often require a so-called "class A" automotive surface which has a high distinctness of image (DOI). For this reason, the filler in many body panel applications will include a material such as mica or wollastonite.

The following examples are provided to illustrate the invention, but not limit the scope thereof. All parts and percentages are by weight unless otherwise indicated.

Evaluation of Dye Mixed with Internal Mold Release Agent First

In this experiment, Acid Black 107 was first added to the internal release agent PAT 657/BW, preheated to 50° C. in the following ratio: 100 g PAT 657/BW+1.62 g Acid Black 107. Mixing procedure involves addition of the dye to PAT 657/BW followed by stirring and heating to 60° C. to aid solubilization. Once in solution, the mixture is stable. 2.0324 grams of such mixture was mixed with 100 grams of VORAFORCE™ 5310 and 16.2 grams amine hardener contains over 90 wt. % of triethylenetetramine and the rest being 1,4-diazabicyclo[2,2,2]octane, based on the total weight of the hardener component.

Samples produced from above procedure were evaluated via gel time measurement and Dynamic DSC analysis following aging of the Pat 657/BW and dye solution at room temperature and 60° C. for 7 and 14 days respectively. This temperature was chosen to represent worst case conditions that the solution may encounter during the manufacturing process.

Gel time, for purposes of this invention, is evaluated according to the following curing evaluation test: the epoxy resin component and hardener component are brought together in the mix head of a KraussMaffei Rim Star RTM 4/4 high-pressure injection machine and injected onto a mold surface at the required molding temperature. Optional materials can be added to either the epoxy resin component or hardener component (or both) either before or at the same time that the epoxy resin and hardener are mixed and injected. The time to gelation was started on impact of the resin with the hot surface. The gel point of the material was determined as the point at which when a spatula was pulled through resin disk the material did not flow back into the cavity created. Demold time is the time after the material contacts the mold surface at which point the disk can be removed from the hot plate surface as a solid, using the pallet knife or similar blade.

Dynamic DSC was used to determine the glass transition temperature Tg of the resin system. In a heating ramp of 20° C./min, the samples were heated from 25 to 200° C., kept isothermal at 200° C. for three minutes, cooled in a ramp of 20° C. to 25° C., kept isothermal at 25° C. for three minutes, then heated again with a heating ramp of 20° C. to 200° C., kept isothermal at 200° C. for 3 minutes, and cooled in a ramp of 20° C. to 25° C. Tg midpoint values are determined from the second heating segment.

Mold temperature in above experiments was 118° C. Aging was conducted by placing the sample of dye mixed with IMR into an oven heated to 60° C. for the defined period or left at room temperature for the required period.

The results are shown below in Table 1.

TABLE 1

Tg and Gel Time of the resin system containing the dye.

| Sample Aging | Glass Transition Temperature (° C.) | Gel Time (s) (High Pressure machine) | Color of clear cast part without carbon fiber |
|---|---|---|---|
| 7 days at 25° C. | 121 | 47 | Strongly black |
| 14 days at 25° C. | 121 | 46 | Strongly black |
| 7 days at 60° C. | 122 | 46 | Strongly black |
| 14 days at 60° C. | 119 | 46 | Strongly black |

Above data demonstrates that the resin systems produced were not affected in any way (even after aging) by the presence of the Acid Black 107 in terms of system reactivity or thermal performance and samples maintain a good level of black coloration throughout.

Evaluation of Dye Mixed with Hardener First

In this experiment, the dye, Acid Black 107, was first added to the same hardener as used in above experiment at 0.2 wt % based on the total weight of the hardener to give an amount of dye in the total resin system as 0.0274 wt %, same as the previous example with the internal release agent. The hardener is then mixed with other components to make up the resin system. The resin system was evaluated via gel time measurement as described previously and DSC analysis following aging of the hardener and dye solution at 60° C. for a defined period. This temperature was chosen to represent worst case conditions that the solution may encounter during the manufacturing process.

Dynamic DSC was used to determine the entitlement Tg of the formulations. In a heating ramp of 20° C./min the samples were heated from 25 to 200° C., kept isothermal at 200° C. for three minutes, cooled in a ramp of 20° C. to 25° C., kept isothermal at 25° C. for three minutes, then heated again with a heating ramp of 20° C. to 200° C., kept isothermal at 200° C. for 3 minutes, and cooled in a ramp of 20° C. to 25° C. Tg midpoint values are determined from the second heating segment. The results are shown in Table 2.

TABLE 2

Tg and Gel Time for sample with dye mixed with hardener first.

| Sample Aging | Glass Transition Temperature (° C.) | Gel Time (s) (High Pressure Machine) | Color of clear cast part without carbon fiber |
|---|---|---|---|
| 4 days at 60° C. | 125 | 45 | Strongly black/slight green tint |
| 12 days at 60° C. | 125 | 45 | Black/slight green tint |

Mold Temperature 118° C.

Again, above data demonstrates that the performance properties of parts produced were not affected in any way in terms of reactivity (even after aging) by the presence of the Acid Black 107 and samples maintain a good level of black coloration throughout.

In terms of color and compared to data shown in Table 1, while the dye is stable reactivity wise in the hardener, the aggressive nature of the hardener causes the intenseness of the color to reduce somewhat. As the IMR is far more benign, the dye is much more stable for longer and at higher temperature than in the hardener.

In both experiments, it is noticed that the dye "Acid Black 107" can be stable in either the internal mold release and/or hardener components. In the production of carbon fiber composites the dye enables parts to be produced that accentuate the carbon fibers enabling them to stand out more clearly and greatly improve their appearance while covering any blemishes, reducing yellowing effects and coloring any stitched areas in the final produced parts. Furthermore the addition of the chosen dye to the internal mold release agent offers the potential and advantage to color different epoxy resin systems with alternative resin and hardener systems the same color due to the use of the common IMR component which is used for various chemistries.

The invention claimed is:

1. A curable epoxy resin system, comprising
   1) an epoxy resin component containing one or more epoxy resins, wherein at least 80% by weight of the epoxy resins is one or more polyglycidyl ethers of a polyphenol that has an epoxy equivalent weight of up to about 250;
   2) an amine hardener, wherein the amine hardener is a polyethylene tetraamine mixture containing at least 95% by weight polyethylene tetraamines, the mixture containing at least 40% by weight linear triethylene tetraamine, wherein the epoxy resin component provides at least 0.8 epoxy equivalents per amine hydrogen equivalent provided by the amine hardener; and
   3) 0.01 to 0.5 moles of triethylene diamine per mole of primary and/or secondary amine compounds in the amine hardener, the triethylene diamine being present in the epoxy resin component, the amine hardener, or both;
   wherein the resin system further comprises an internal mold release agent mixed with a dye solution, wherein the dye is a naphthalene diazine functionality with low degree of sulfonation.

2. The curable epoxy resin system of claim 1, which contains 0.09 to 0.175 moles of triethylene diamine per part per mole of per mole of primary and/or secondary amine compounds in the amine hardener.

3. The curable epoxy resin system of claim 1, which further comprises 0.1 to 10 parts by weight, per part by weight triethylene diamine, of a hydroxyl compound selected from the group consisting of water and compounds having at least one hydroxyl group and an equivalent weight per hydroxyl group of up to 75.

4. A curable epoxy resin system, comprising
   1) an epoxy resin component containing one or more epoxy resins, wherein at least 80% by weight of the epoxy resins is one or more polyglycidyl ethers of a polyphenol that has an epoxy equivalent weight of up to about 250;
   2) an amine hardener, wherein the amine hardener is a polyethylene tetraamine mixture containing at least 95% by weight polyethylene tetraamines, the mixture containing at least 40% by weight linear triethylene tetraamine, wherein the epoxy resin component provides at least 0.8 epoxy equivalents per amine hydrogen equivalent provided by the amine hardener; and
   3) 0.01 to 0.5 moles of triethylene diamine per mole of primary and/or secondary amine compounds in the amine hardener, the triethylene diamine being present in the epoxy resin component, the amine hardener, or both;
   wherein the resin system further comprises an internal mold release agent mixed with a dye solution, wherein the dye solution comprises 2-naphthalenol, 1-[2-(2-hydroxy-5-nitrophenyl)diazenyl], acetamide, N-[7-hydroxy-8-[2-(2-hydroxy-4-nitrophenyl)diazenyl]-1-naphthalenyl], and Mordant Black 17.

\* \* \* \* \*